United States Patent
Yasuda et al.

(10) Patent No.: US 7,876,988 B2
(45) Date of Patent: Jan. 25, 2011

(54) OPTICAL FIBER MOUNTING WAVEGUIDE DEVICE AND METHOD FOR FABRICATING SAME

(75) Inventors: Hiroki Yasuda, Mito (JP); Kouki Hirano, Hitachigaku (JP); Takami Ushiwata, Hitachi (JP)

(73) Assignee: Hitachi Cable, Ltd., Tokyo (JP)

( * ) Notice: Subject to any disclaimer, the term of this patent is extended or adjusted under 35 U.S.C. 154(b) by 187 days.

(21) Appl. No.: 12/149,530

(22) Filed: May 2, 2008

(65) Prior Publication Data

US 2008/0285928 A1    Nov. 20, 2008

(30) Foreign Application Priority Data

May 8, 2007    (JP)    ............... 2007-123470

(51) Int. Cl.
*G02B 6/30*    (2006.01)
(52) U.S. Cl. ............... 385/49; 385/39; 385/51; 385/126
(58) Field of Classification Search .......... 385/39, 385/49, 51, 126
See application file for complete search history.

(56) References Cited

U.S. PATENT DOCUMENTS

| | | | | |
|---|---|---|---|---|
| 5,481,632 | A | * | 1/1996 | Hirai et al. .................. 385/49 |
| 5,784,509 | A | * | 7/1998 | Yamane et al. .............. 385/49 |
| 7,603,021 | B2 | * | 10/2009 | Watanabe .................. 385/137 |
| 2006/0215964 | A1 | | 9/2006 | Kuroda et al. |

FOREIGN PATENT DOCUMENTS

| | | |
|---|---|---|
| CN | 1886687 A | 12/2006 |
| JP | 2002-267860 | 9/2002 |
| JP | 2006-184754 | 7/2006 |

OTHER PUBLICATIONS

Chinese Office Action dated Nov. 27, 2010, with English translation.

* cited by examiner

*Primary Examiner*—Ellen Kim
(74) *Attorney, Agent, or Firm*—McGinn IP Law Group, PLLC (57) ABSTRACT

An optical fiber mounting waveguide device and a method for fabricating the same, which provide a low optical connection loss and a high productivity. An under cladding layer ($3u$), a core (4), and an over cladding layer ($3o$) are sequentially formed on a substrate (8) to constitute an optical fiber mounting waveguide device (1). An optical fiber mounting groove (2) for mounting an optical fiber (6) is formed on the optical fiber mounting waveguide device (1). An end surface ($3a$) of the over cladding layer ($3o$) faces to the optical fiber mounting groove (2). The core (4) and the under cladding layer ($3u$) are projected toward the optical fiber mounting groove (2) with respect to the end surface ($3a$) of the over cladding layer ($3o$).

19 Claims, 7 Drawing Sheets

OPTICAL FIBER MOUNTING WAVEGUIDE DEVICE AND METHOD FOR FABRICATING SAME

The present application is based on Japanese Patent Application No. 2007-123470, the entire contents of which are incorporated herein by reference.

BACKGROUND OF THE INVENTION

1. Field of the Invention

The present invention relates to an optical fiber mounting waveguide device and a method for fabricating the same in which an optical connection loss is small, and productivity is high.

2. Related Art

Conventionally, in a waveguide device on which an optical fiber is mounted (hereinafter, referred as "optical fiber mounting waveguide device"), an optical fiber groove for guiding an optical fiber on an extended line of a core and easily fixing the optical fiber stably.

The optical fiber mounting waveguide device is provided with end surfaces of a cladding and the core facing to the optical fiber mounting groove. In other words, the cladding is provided with a stepped portion, and a bottom part of the stepped portion is provided as a bottom surface of the optical fiber groove, so that an end surface of the optical fiber mounted in the optical fiber groove contacts with the end surfaces of the cladding and the core.

Japanese Patent Application Laid-Open No. 2006-184754 (JP-A-2006-184754) and Japanese Patent Application Laid-Open No. 2002-267860 (JP-A-2002-267860) disclose the conventional optical fiber mounting waveguide devices.

Figure 4:
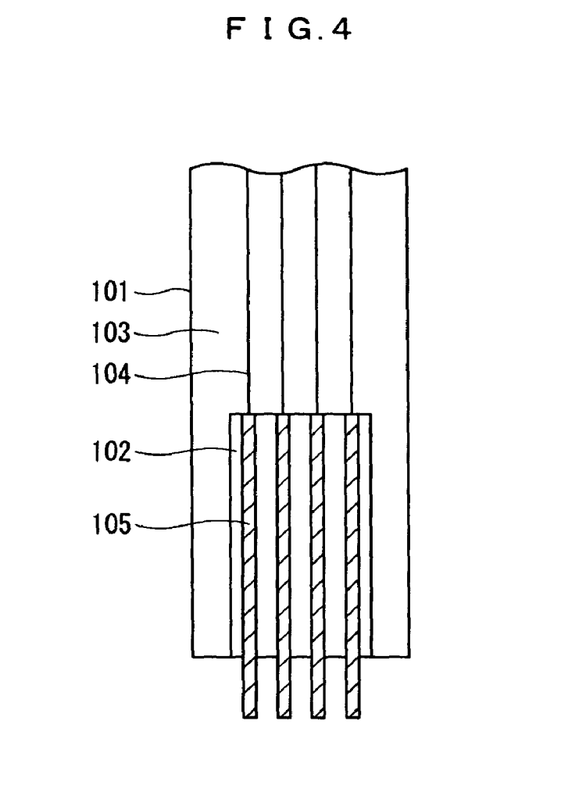
FIG. 4 is a plan view of an optical fiber mounting waveguide device in a first conventional example.

FIG. 4 is a plan view of an optical fiber mounting waveguide device in a first conventional example.

As shown in FIG. 4, the conventional optical fiber mounting waveguide device 101 comprises an optical fiber groove 102 for mounting an optical fiber 105, a cladding 103, a core 104 surrounded by the cladding 103 and formed until an end surface of the cladding 103, in which an end surface of the optical fiber 105 mounted in the optical fiber groove 102 contacts with the end surface of the cladding 103, so that a core (not shown) of the optical fiber 105 is optically coupled to the core 104 in the optical fiber mounting waveguide device 101.

Figure 5:
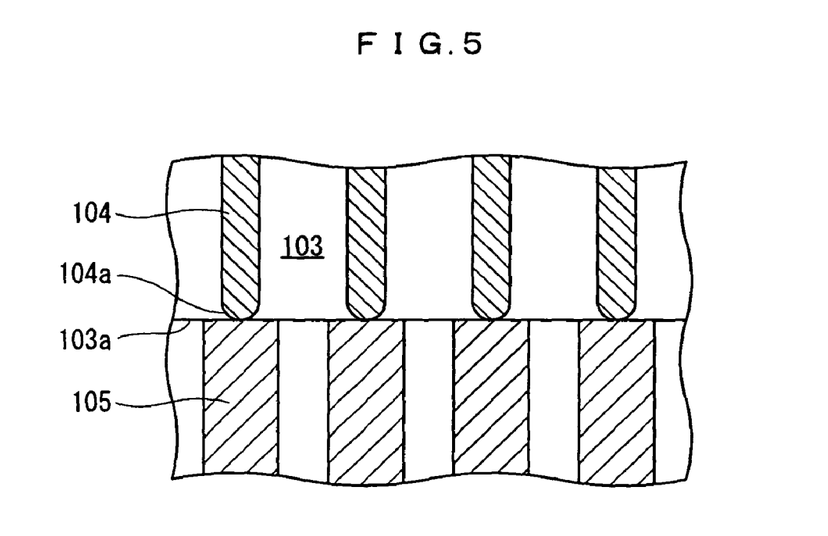
FIG. 5 is a partially enlarged view of the conventional optical fiber mounting waveguide device shown in FIG. 4.

FIG. 5 is a partially enlarged view of the conventional optical fiber mounting waveguide device shown in FIG. 4.

FIG. 5 shows an enlarged plan view of a portion in vicinity of the end surface of the cladding 103. A tip portion 104a of the core 104 has roundness as shown in FIG. 5. The roundness of the end surface of the cladding 103 is formed as follows. For example, when the optical fiber mounting waveguide device 101 is fabricated by photolithography technique (direct exposure), a photomask is provided for the exposure on a base waveguide substrate so that the core 104 and the cladding 103 are formed to be defined in a desired configuration on the base waveguide substrate. At this time, for example, a diffraction of light may occur at edges of the photomask, so that a mask pattern that is right angle-edged on the photomask is exposed with the roundness. Even if a core pattern in the photomask is right angle-edged, since the end surface of the cladding 103 is located at the edge of the photomask, the tip portion 104a of the formed core 104 has the roundness. In particular, the roundness is easily formed at the tip portion 104a of the core 104, when a core diameter (core size) is small.

In addition, a space between the tip portion 104a having the roundness of the core 104 and an end surface 103a of the cladding 103 is filled with the cladding 103.

When the tip portion 104a of the core 104 has the roundness as shown in FIG. 5, the cladding 103 intrudes a gap between a curved surface of the tip portion 104a of the core 104 and the optical fiber 105, so that an interface between the core 104 and cladding 103 is curved. As a result, an optical path is changed due to the refraction of the light, and the light significantly leaks in adjacent cores, so that an optical isolation is deteriorated and an optical connection loss is increased.

In addition, when the tip portion 104a of the core 104 has the roundness and is covered by the cladding 103, an optical coupling property is greatly changed in accordance with a relative position (a position in an orientation along the end surface) of the core 104 with respect to the optical fiber 105, so that a dispersion in the loss due to variation of the relative position (the orientation along the end surface) between the core tip portion 104a and the optical fiber caused by manufacturing dispersion. As a result, the productivity of the optical fiber mounting waveguide device is decreased.

Figure 6:
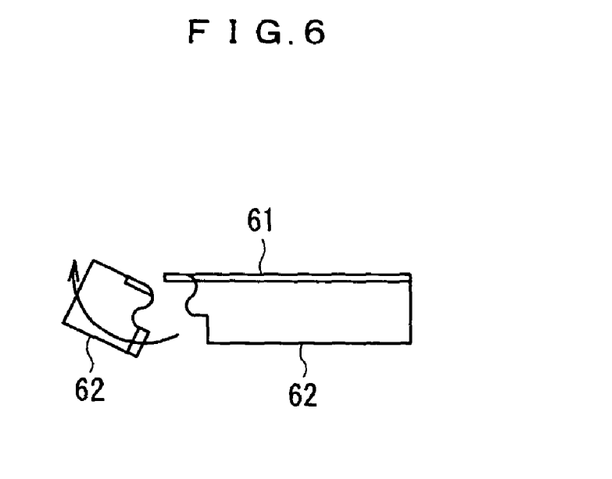
FIG. 6 is a cross sectional view of an optical fiber mounting waveguide device in a second conventional example.

FIG. 6 is a cross sectional view of an optical fiber mounting waveguide device in a second conventional example.

In the optical waveguide device disclosed by JP-A-2002-267860, there is a problem in that the core end surface has the roundness as described above so that the optical connection loss is increased in the connection with the optical fiber. Further, as shown in FIG. 6, according to this method, an optical connection end surface of a core 61 is formed in a concave portion of a cladding 62. Thereafter, a cladding material and a substrate covering the optical connection end surface are removed to provide an optical waveguide in which the core 61 is protruded from a cladding end surface. Therefore, there is a problem in that the core 61 is damaged during the removal process of the cladding 62.

SUMMARY OF THE INVENTION

Accordingly, it is an object of the present invention to solve the problem, and to provide an optical fiber mounting waveguide device and a method for fabricating the same in which the optical connection loss is small and the productivity is high.

According to a first feature of the invention, an optical fiber mounting waveguide device comprises:

a substrate;

an optical fiber mounting groove provided on a part of the substrate for mounting an optical fiber;

an under cladding layer and a core sequentially formed on the substrate; and an over cladding layer formed on the core, the over cladding layer having an end surface facing to the optical fiber mounting groove, and wherein the core and the under cladding layer are protruded toward the optical fiber mounting groove with respect to the end surface of the over cladding layer.

According to a second feature of the invention, an optical fiber mounting waveguide device comprises:

a substrate;

an optical fiber mounting groove provided on the substrate for mounting an optical fiber;

an under cladding layer and a core sequentially formed on the substrate; and an over cladding layer formed on the core, the over cladding layer having an end surface facing to the optical fiber mounting groove, and wherein the core has a protruded part extending toward the optical fiber mounting groove with respect to the end surface of the over cladding layer and a downwardly protruded part.

In the optical fiber mounting waveguide device, the core may comprise a plurality of cores coupled to each other outside the end surface of the over cladding layer.

In the optical fiber mounting waveguide, the core may comprise a plurality of cores, and each of the cores is extended to adjacent ones outside the end surface of the over cladding layer.

In the optical fiber mounting waveguide device, the optical fiber may be mounted in the optical fiber mounting groove, an end surface of the optical fiber contacts with the core, in which the core and the optical fiber are connected by curing an adhesive filled between the end surface of the optical fiber and end surfaces of the over cladding layer, the core, and the under cladding layer, and a difference between refractive indices of the core and the adhesive after curing is within ±0.005.

In the optical fiber mounting waveguide device, a material of the core may be same as a material of the adhesive.

According to a third feature of the invention, a method for fabricating an optical fiber mounting waveguide device comprises:

forming an optical fiber mounting groove on the optical fiber mounting waveguide device for mounting an optical fiber;

forming an under cladding layer and a core sequentially on a substrate at a position facing to the optical fiber mounting groove;

coating a cladding material on the under cladding layer and the core;

providing a mask pattern for covering a part of the over cladding layer at the position facing to the optical fiber mounting groove; and exposing the cladding material to provide an over cladding layer, in which the core and the under cladding layer are protruded toward the optical fiber mounting groove with respect to an end surface of the over cladding layer.

According to a fourth feature of the invention, a method for fabricating an optical fiber mounting waveguide device comprises:

forming an optical fiber mounting groove on the optical fiber mounting waveguide device for mounting an optical fiber;

forming an under cladding layer on a substrate at a position facing to the optical fiber mounting groove;

coating a core material across the under cladding layer and a part of the substrate at a side of the optical fiber mounting groove;

directly exposing the core material to provide an L-shaped core which covers across the under cladding layer and a surface of the substrate at the side of the optical fiber mounting groove;

coating a cladding material on the under cladding layer and the core;

providing a mask pattern for covering a part of the over cladding layer at the position facing to the optical fiber mounting groove; and exposing the cladding material to provide an over cladding layer, in which the core is protruded toward the optical fiber mounting groove with respect to an end surface of the over cladding layer.

In the method for fabricating an optical fiber mounting waveguide device, the core may comprise a plurality of cores coupled to each other outside the end surface of the over cladding layer.

In the method for fabricating an optical fiber mounting waveguide device, the core may comprise a plurality of cores, and each of the cores is extended to adjacent ones outside the end surface of the over cladding layer.

The method for fabricating an optical fiber mounting waveguide device may further comprise:

mounting the optical fiber in the optical fiber mounting groove such that an end surface of the optical fiber contacts with the core; and curing an adhesive filled between the end surface of the optical fiber and end surfaces of the over cladding layer, the core, and the under cladding layer, to connect the core and the optical fiber, in which a difference between refractive indices of the core and the adhesive after curing is within ±0.005.

In the method for fabricating an optical fiber mounting waveguide device, the core material may be same as a material of the adhesive.

EFFECTS OF THE INVENTION

According to the present invention, it is possible to provide following excellent effects.

(1) The optical connection loss is small.
(2) The productivity is high.

BRIEF DESCRIPTION OF THE DRAWINGS

Next, preferred embodiments according to the present invention will be explained in conjunction with appended drawings, wherein:

FIGS. 1A to 1C are explanatory diagrams showing an optical fiber mounting waveguide device in a first preferred embodiment according to the present invention, wherein

FIGS. 2A to 2C are explanatory diagrams showing an optical fiber mounting waveguide device in a second preferred embodiment according to the present invention, wherein

FIGS. 3A and 3B are explanatory diagrams showing an optical fiber mounting waveguide device in a fourth preferred embodiment according to the present invention, wherein

DETAILED DESCRIPTION OF PREFERRED EMBODIMENTS

Next, preferred embodiments according to the present invention will be explained in more detail in conjunction with the appended drawings.

First Preferred Embodiment

Figure 1A:
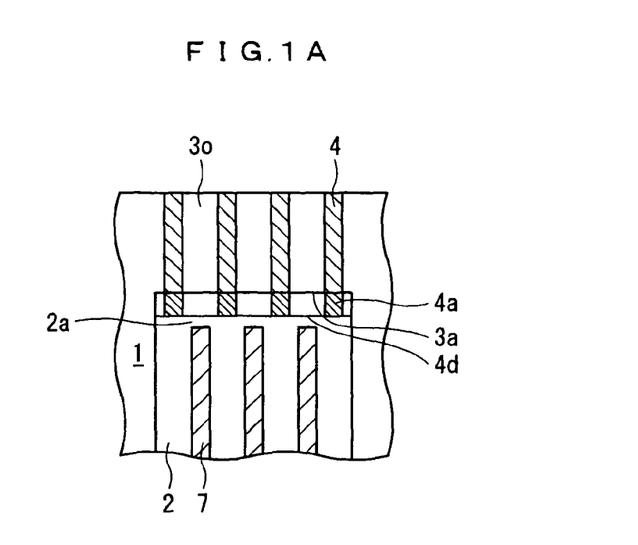
FIG. 1A is a plan view of the optical fiber mounting waveguide device.
Figure 1B:
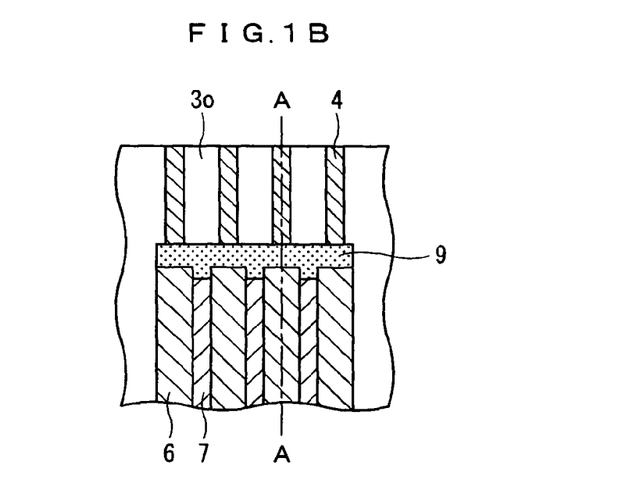
FIG. 1B is a plan view of the optical fiber mounting waveguide device on which an optical fiber is mounted.
Figure 1C:
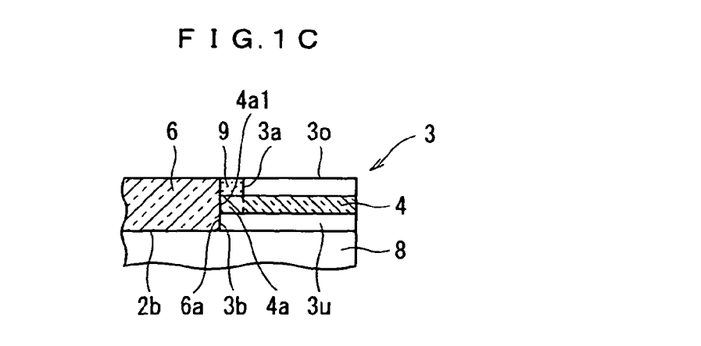
FIG. 1C is a cross sectional view along A-A of the optical fiber mounting waveguide device shown in FIG. 1B.

FIGS. 1A to 1C are explanatory diagrams showing an optical fiber mounting waveguide device in a first preferred embodiment according to the present invention, wherein FIG. 1A is a plan view of the optical fiber mounting waveguide device, FIG. 1B is a plan view of the optical fiber mounting waveguide device on which an optical fiber is mounted, and FIG. 1C is a cross sectional view along A-A of the optical fiber mounting waveguide device shown in FIG. 1B.

As shown in FIGS. 1A and 1B, an optical fiber mounting waveguide device 1 in a first preferred embodiment according to the present invention comprises an under cladding layer 3u as a first layer of a cladding 3, a core 4, and an over cladding layer 3o as a second layer of the cladding 3 sequentially formed on the substrate 8. Further, an optical fiber mounting groove 2 for mounting an optical fiber 6 is formed on the optical fiber mounting waveguide device 1. In the optical fiber mounting waveguide device 1, an end surface 3a of the over cladding layer 3o faces to the optical fiber mounting groove 2 and a lateral groove 2a, and the core 4 and the under cladding layer 3u are protruded with respect to the end surface 3a of the over cladding layer 3o at an optical fiber mounting groove side, namely, toward the optical fiber mounting groove 2.

The cladding 3 (the under cladding layer 3u and the over cladding layer 3o) and the core 4 constitute an optical waveguide element. An interface between an optical waveguide element side and the optical fiber groove side is indicated as a boundary 4d.

The optical fiber mounting waveguide device 1 in the first preferred embodiment comprises four cores 4 provided in parallel with a constant pitch, and optical fiber fastening wedges 7 are formed on extended lines of central axes of regions between the respective cores 4, to provide a plurality of the optical fiber mounting grooves 2.

In the optical fiber mounting waveguide device 1 in the first preferred embodiment, the under cladding layer 3u is provided directly beneath a protruded part 4a of the core 4, and the protruded part 4a is protruded with respect to the end surface 3a of the over cladding layer 3o, namely with respect to the boundary 4d.

(Method for Fabricating the Optical Fiber Mounting Waveguide Device 1)

Next, the optical fiber mounting waveguide device 1 in the first preferred embodiment will be explained below.

The optical fiber mounting waveguide device 1 is fabricated by the direct exposure.

FIGS. 8A to 8D are explanatory diagrams showing a method for fabricating the optical fiber waveguide mounting device in the first preferred embodiment according to the present invention.

Figure 8A:
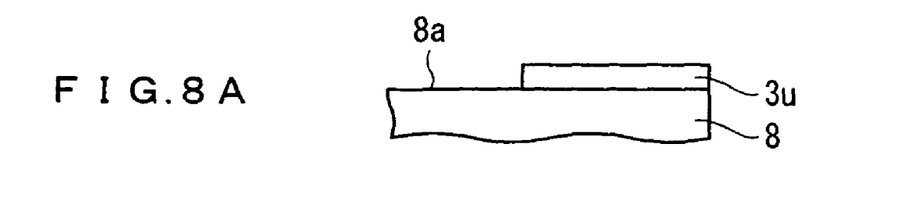
FIGS. 8A to 8D are explanatory diagrams showing a method for fabricating the optical fiber waveguide mounting device in the first preferred embodiment according to the present invention.

As shown in FIG. 8A, a UV curing cladding material is applied on the substrate 8 by using a spin coating machine, and UV irradiation is conducted to cure the UV curing cladding material, so as to form the under cladding layer 3u at a desired part. Thereafter, the UV curing cladding material at an unexposed part is removed by a developing fluid.

Figure 8B:
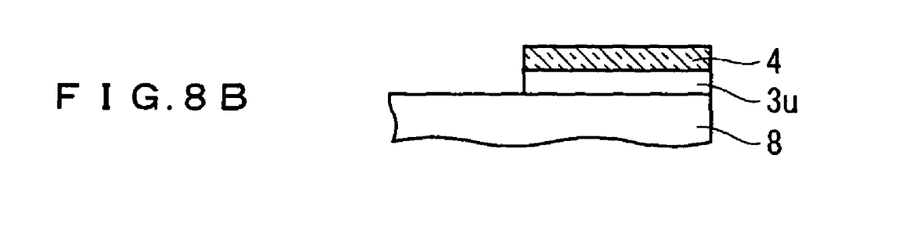

Next, as shown in FIG. 8B, a core material 4' is applied on the under cladding layer 3u and the direct exposure is conducted. Then, the core material 4' at an unexposed part is removed by the developing fluid, to provide the core 4.

Figure 8C:
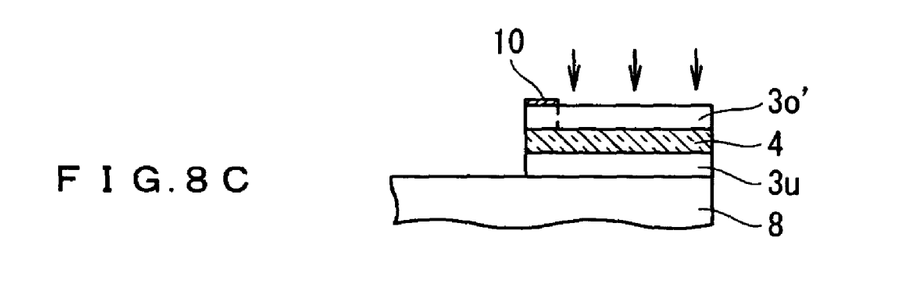

Further, as shown in FIG. 8C, an over cladding material 3o' for the over cladding layer 3o is applied on the core 4 and a photomask 10 for forming the protruded part 4a of the core 4 is provided. Thereafter, the direct exposure is conducted.

Figure 8D:
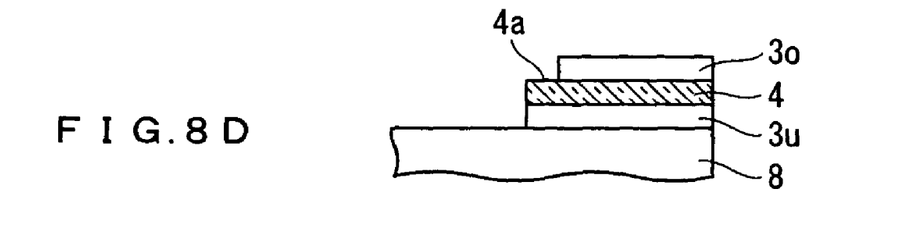

As shown in FIG. 8D, the unexposed part is removed by the developing fluid, so that the exposed part remains as the cladding layer 3o.

According to the aforementioned process, as shown in FIG. 1C, the core 4 and the over cladding layer 3o are formed such that the protruded part 4a of the core 4 and the under cladding layer 3u are protruded to the same extent from the end surface 3a of the over cladding layer 3o at the side of the optical fiber mounting groove 2.

As shown in FIG. 1B, in the optical fiber mounting waveguide device 1, the optical fiber 6 is installed in the optical fiber mounting groove 2, and an end surface 6a of the optical fiber 6 contacts with a tip portion (end surface) 4a1 of a protruded part 4a of the core 4 and a tip portion 3b of the under cladding layer 3u that are protruded with respect to the end surface 3a of the over cladding layer 3o. A gap between the end surface 6a of the optical fiber 6 and the end surface 3a of the over cladding layer 3o, the tip portion (end surface) 4a1 of the protruded part 4a of the core 4, and an end surface 3b of the under cladding layer 3u is filled with an adhesive 9 having a same refractive index as that of the core 4. The adhesive 9 is cured after filling, and it is sufficient if the refractive index of the adhesive 9 is the same as that of the core 4 after curing.

(Function and Effect)

Next, function and effect of the present invention will be explained below.

In the optical fiber mounting waveguide device 1 shown in FIGS. 1A to 1C, when the optical fiber 6 is mounted in the optical fiber mounting groove 2, the end surface 6a of the optical fiber 6 contacts with the tip portion 4a1 of the protruded part 4a of the core 4 that is protruded with respect to the end surface 3a of the over cladding layer 3o. Since the optical fiber mounting waveguide device 1 is fabricated by direct exposure and the tip portion 4a1 of the protruded part 4a protruded with respect to the end surface 3a of the over cladding layer is located at an edge of the photomask 10 (shown in FIG. 8C), the tip portion 4a1 of the protruded part 4a of the core 4 has a roundness when observed in an enlarged view thereof.

However, the present invention is different from the conventional device in that the protruded part 4a of the core 4 is protruded with respect to the end surface 3a of the over cladding layer 3o. Therefore, no cladding is provided between a curved surface of the tip portion 4a1 of the protruded part 4a and the end surface 6a of the optical fiber 6. Accordingly, when the adhesive 9 is filled between the end surface 3a of the over cladding layer 3o and the end surface 6a of the optical fiber 6, the adhesive 9 intrudes between the curved surface of the tip portion 4a1 of the protruded part 4a and the end surface 6a of the optical fiber 6.

As shown in FIG. 1B, a gap between the end surface 3a of the over cladding layer 3o and an end surface 7a of the optical fiber fastening wedge 7 is also filled with the adhesive 9.

The refractive index of the core 4 is equal to that of the adhesive 9 after curing, so that a light propagates from the core 4 to the optical fiber 6 or from the optical fiber 6 to the core 4 straightly through a connecting portion between the core 4 and the optical fiber 6. Therefore, it is possible to prevent the light from leaking into the adjacent cores, thereby remarkably reducing the deterioration in the optical isolation and the optical connection loss.

According to the above structure, it is possible to reduce a deterioration amount of the optical coupling depending on the relative position of the core with the optical fiber. Therefore, it is possible to improve a mounting tolerance of the optical fiber, thereby improving the productivity of the optical fiber mounting waveguide device.

Further, in the first preferred embodiment, the under cladding layer $3u$ is provided directly beneath the protruded part $4a$ protruded with respect to the end surface $3a$ of the over cladding layer $3o$. Although the under cladding layer $3u$ is not indispensable, a mechanical strength of the protruded part $4a$ of the core 4 is reinforced by the under cladding layer $3u$. Therefore, when the optical fiber 6 is mounted in the optical fiber mounting groove 2 and pressed to abut against the protruded part $4a$ of the core 4, a margin of a relative strength of an indenting pressure can be increased since a resistance characteristic for the indenting pressure is increased. As a result, since the indenting pressure may be roughly adjusted, it is possible to improve the productivity of the optical fiber mounting waveguide device 1.

According to the method for fabricating the optical fiber mounting waveguide device 1 in the first preferred embodiment, since it is possible to directly fabricate the core 4 having the protruded part $4a$ that is protruded with respect to the end surface $3a$ of the over cladding layer $3o$, the core 4 will not be damaged during the manufacturing process, thereby improving the productivity of the optical fiber mounting waveguide device 1. In addition, since an excessive process such as a process of removing the cladding is not required, it is possible to fabricate the optical fiber mounting waveguide device in low cost.

Second Preferred Embodiment

Next, the second preferred embodiment according to the invention will be explained below.

Figure 2A:
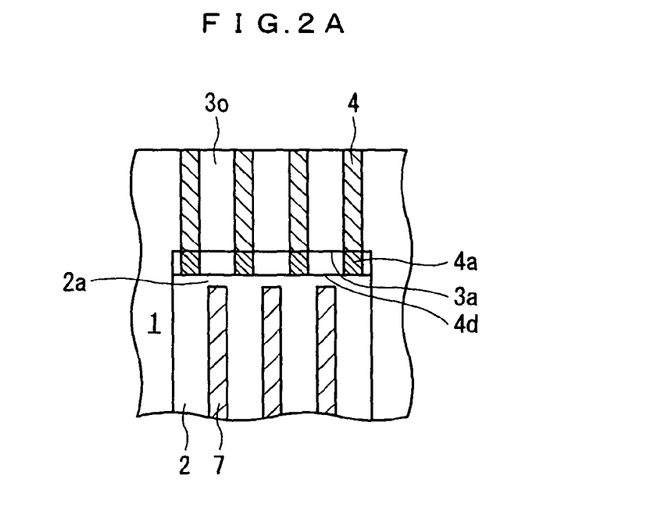
FIG. 2A is a plan view of the optical fiber mounting waveguide device.
Figure 2B:
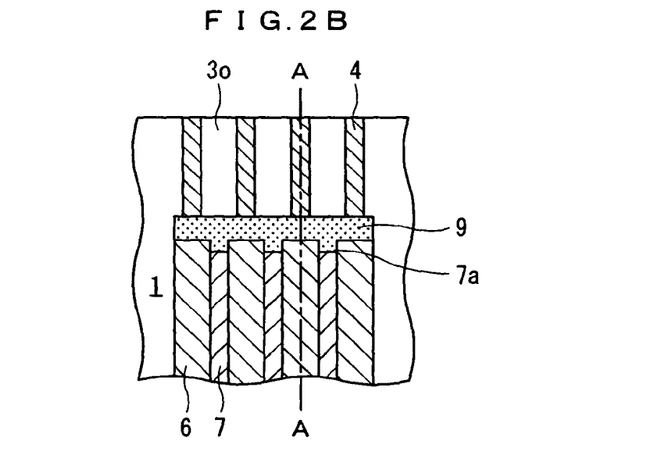
FIG. 2B is a plan view of the optical fiber mounting waveguide device on which an optical fiber is mounted.
Figure 2C:
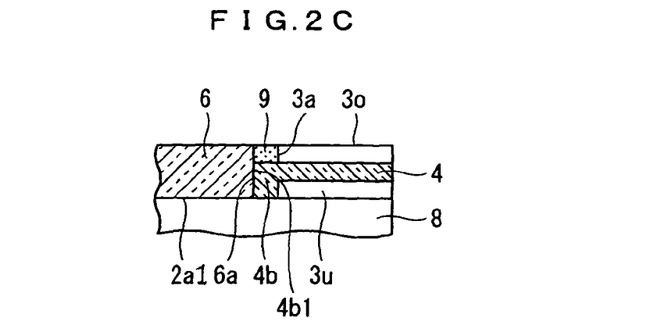
FIG. 2C is a cross sectional view along A-A of the optical fiber mounting waveguide device shown in FIG. 2B.

FIGS. 2A to 2C are explanatory diagrams showing an optical fiber mounting waveguide device in a second preferred embodiment according to the present invention, wherein FIG. 2A is a plan view of the optical fiber mounting waveguide device, FIG. 2B is a plan view of the optical fiber mounting waveguide device on which an optical fiber is mounted, and FIG. 2C is a cross sectional view along A-A of the optical fiber mounting waveguide device shown in FIG. 2B.

As shown in FIGS. 2A to 2C, in the optical fiber mounting waveguide device 1, the core 4 is protruded with respect to the end surface $3a$ of the over cladding layer $3o$, and formed downwardly until a bottom surface $2a1$ of the lateral groove $2a$ to have an L-shape. The bottom surface $2a1$ of the lateral groove $2a$ is provided at the same plane as the bottom surface $2b$ of the optical fiber mounting groove 2. In other words, a part of the under cladding layer $3u$ in FIG. 1B is provided as a downwardly protruded part $4b$ of the core 4.

(Method for Fabricating the Optical Fiber Mounting Waveguide Device 1)

Next, the method for fabricating the optical fiber mounting waveguide device 1 in the second preferred embodiment will be explained.

FIGS. 9A to 9D are explanatory diagrams showing a method for fabricating the optical fiber waveguide mounting device in the second preferred embodiment according to the present invention.

Figure 9A:
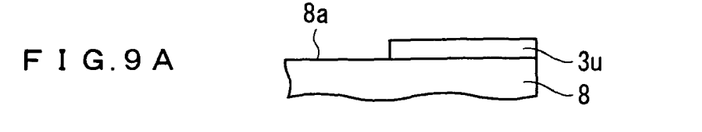
FIGS. 9A to 9D are explanatory diagrams showing a method for fabricating the optical fiber waveguide mounting device in the second preferred embodiment according to the present invention.

As shown in FIG. 9A, similarly to the first preferred embodiment, the under cladding layer $3u$ is formed on the substrate 8.

Figure 9B:
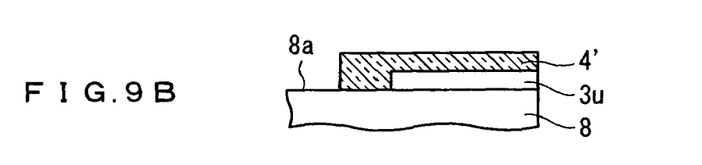

Next, as shown in FIG. 9B, a core material $4'$ is applied on the under cladding layer $3u$ and a part $8a$ of the substrate 8 facing to the optical fiber mounting groove 2.

Figure 9C:
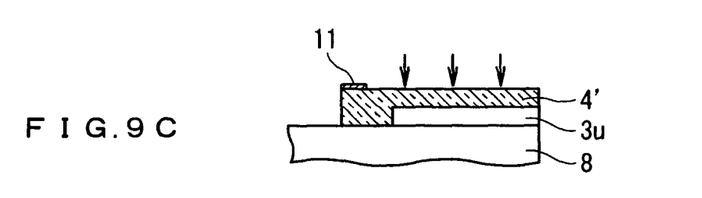

Then, as shown in FIG. 9C, a photomask 11 for providing the protruded part $4a$ and the downwardly protruded part $4b$ of the core 4 is provided at a desired part of the core material $4'$. Further, the direct exposure is conducted, and the core material $4'$ at an unexposed part is removed by the developing fluid.

Figure 9D:
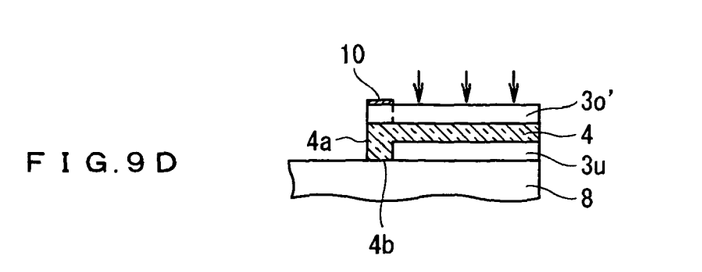

Further, as shown in FIG. 9D, a cladding material $3o'$ for the over cladding layer $3o$ is applied on the core 4 and a photomask 10 for forming the protruded part $4a$ of the core 4 is provided. Thereafter, the direct exposure is conducted.

Figure 9E:
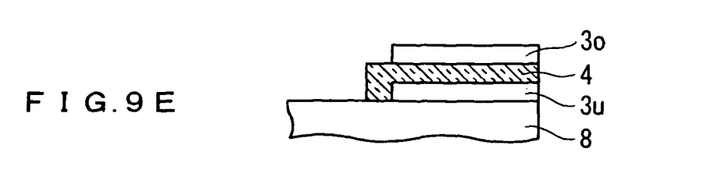

As shown in FIG. 9E, the unexposed part is removed by the developing fluid, so that the exposed part remains as the cladding layer $3o$.

According to the above process, as shown in FIG. 2C, the protruded part $4a$ of the core 4 protrudes toward the optical fiber mounting groove 2 with respect to the end surface $3a$ of the over cladding layer $3o$, and the downwardly protruded part $4b$ of the core 4 reaches the bottom surface $2a1$ of the lateral groove $2a$, so that a total configuration of the core 4 is L-shaped. The over cladding layer $3o$ is formed such that the protruded part $4a$ that is a part of the L-shaped core 4 protrudes with respect to the end surface $3a$ of the over cladding layer $3o$.

As shown in FIG. 2C, An end surface $4b1$ of the downwardly protruded part $4b$ contacts with the end surface $6a$ of the optical fiber 6.

(Function and Effect of the Second Preferred Embodiment)

In the second preferred embodiment, the downwardly protruded part $4b$ of the core 4 is provided directly beneath the protruded part $4a$, so that mechanical strength of the protruded part $4a$ of the core 4 is reinforced by the downwardly protruded part $4b$. Accordingly, it is possible to improve the yield of the optical fiber mounting waveguide device. In addition, since the margin of the relative strength of the indenting pressure for the optical fiber is increased, it is possible to improve the productivity of the optical fiber mounting waveguide device.

According to the above structure, it is possible to reduce the deterioration amount of the optical coupling depending on the relative position of the core with the optical fiber. Therefore, it is possible to improve a mounting tolerance of the optical fiber, thereby improving the productivity of the optical fiber mounting waveguide device.

Third Preferred Embodiment

Figure 7:
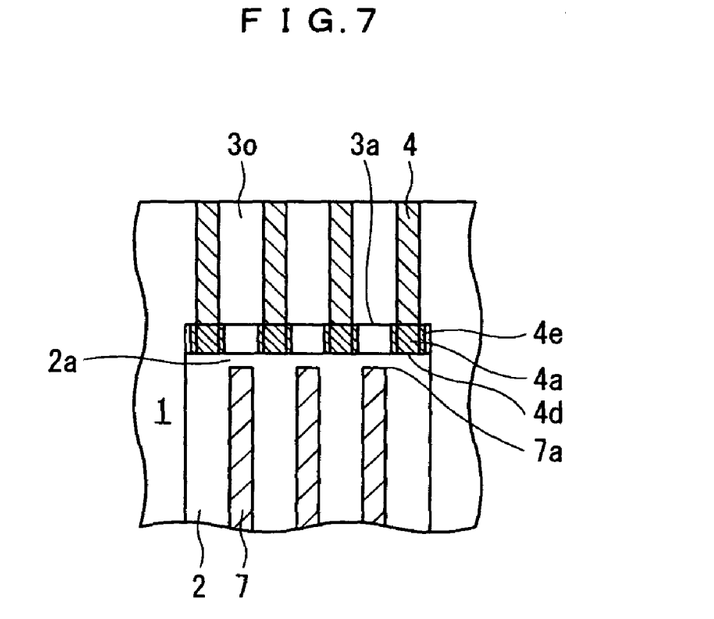
FIG. 7 is a plan view of an optical fiber mounting waveguide device in a third preferred embodiment according to the present invention.

FIG. 7 is a plan view of an optical fiber mounting waveguide device in a third preferred embodiment according to the present invention.

In the third preferred embodiment as shown in FIG. 7, a protruded part $4a$ of the core 4 may be extended in a lateral direction toward the adjacent cores and outside the end surface $3a$ of the over cladding layer $3o$, to provide an extended part $4e$. According to this embodiment, even when the extended part $4e$ of the protruded part $4a$ of the core 4 has the roundness, an area of the end surface of the core 4 contacting with the optical fiber 6 is increased. Accordingly, when connecting the optical fiber 6 with the core 4 by abutting the optical fiber 6 and the core 4 to each other, the stable connection can be realized. Therefore, an excessive load will not be applied to the boundary (interface) 4d between the end surface 3a of the over cladding layer 3o and the protruded part (core tip portion) 4a, thereby reinforcing the mechanical strength of the device.

Fourth Preferred Embodiment

Figure 3A:
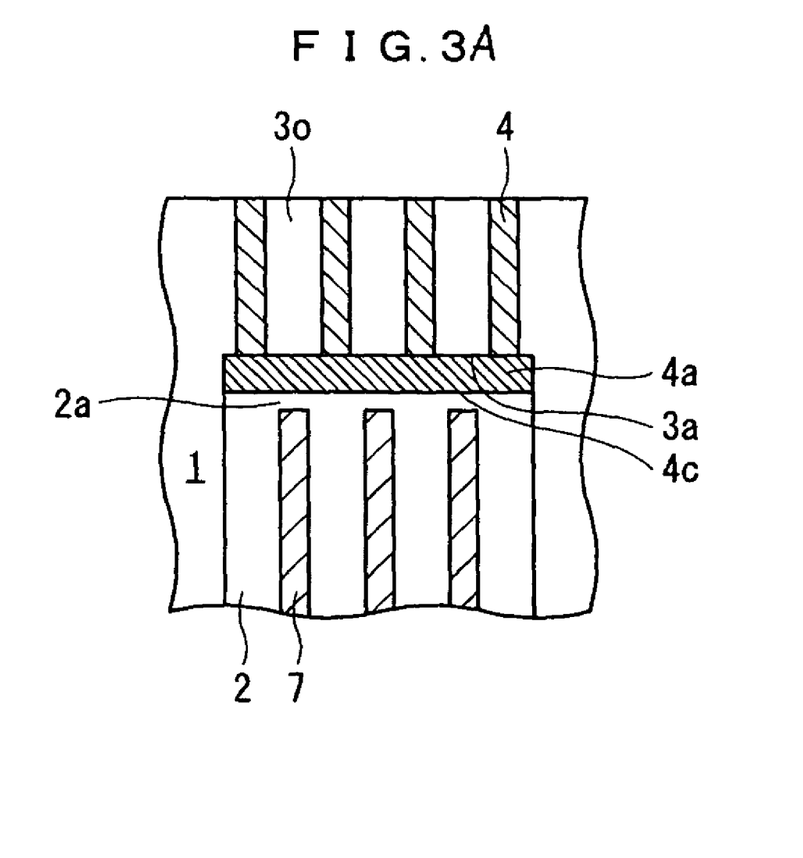
FIG. 3A is a plan view thereof.
Figure 3B:
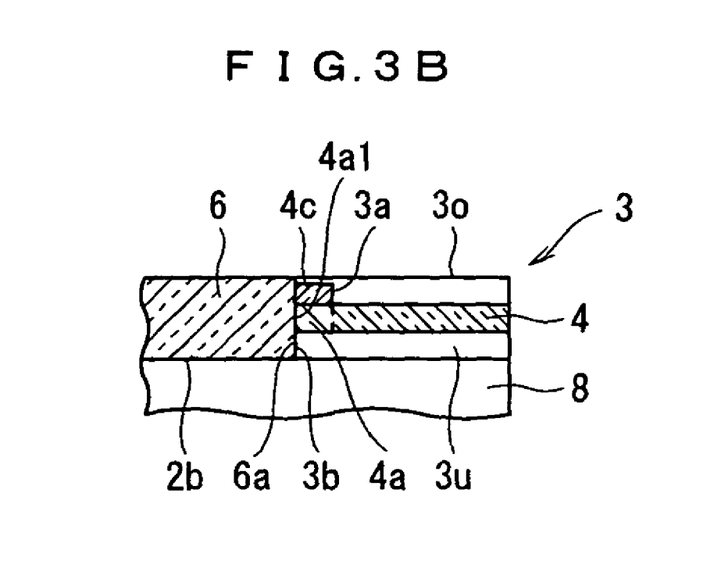
FIG. 3B is a cross sectional view thereof.

FIGS. 3A and 3B are explanatory diagrams showing an optical fiber mounting waveguide device in a fourth preferred embodiment according to the present invention, wherein FIG. 3A is a plan view thereof, and FIG. 3B is a cross sectional view thereof.

In the fourth preferred embodiment shown in FIG. 3A, a plurality of the cores 4 are provided and the adjacent cores 4 are coupled to each other by an lateral core 4c provided outside the end surface 3a of the over cladding layer 3o.

In other words, the lateral core 4c is provided across the protruded parts 4a of the cores 4.

In the fourth preferred embodiment, the protruded parts 4a protruded with respect to the end surface 3a of the over cladding layer 3o are coupled to each other by means of the lateral core 4c, the mechanical strength of the core 4a is further reinforced. At this time, a part of the lateral core 4c may be provided inside the cladding 3.

Herein, FIG. 3B shows an example of the location of the lateral core 4c. The lateral core 4c may be provided between the protruded parts 4a of the core 4.

Example

In the first to fourth preferred embodiments, GI50 (a core diameter of 50 μm, and an optical fiber diameter of 125 μm) is used as the optical fiber 6, an acrylic resin (a refractive index of 1.52) is used as the cladding 3 of the optical waveguide element, an acrylic resin (a refractive index of 1.57) is used as the core 4, and an epoxy resin (a refractive index of 1.57) is used as the adhesive 9. In addition, a film thickness of the under cladding layer 3u is 45 μm, the core 4 has dimensions of 35 μm×35 μm, and a film thickness of the over cladding layer 3o at a region directly above the core 4 is 45 μm.

Since a bonding force of an epoxy adhesive is stronger than that of an acrylic adhesive, it is preferable to use the epoxy adhesive for the adhesive 9. Alternatively, when the acrylic adhesive is used for the adhesive 9, it is possible to easily realize the refractive index matching between the core 4 and the adhesive 9, since the material same as the material of the core 4 is used as the adhesive 9. However, in the present invention, the material of the adhesive 9 is not limited thereto.

Important factors for the adhesive 9 are as follows:

1) the material is transparent with respect to a wavelength of a light to be used;

2) a difference between the refractive index of the material after curing and the refractive index of the core 4 is within 0.005, more preferably, the refractive index of the material after curing is equal to the refractive index of the core 4; and 3) the material has a sufficient bonding property with the optical fiber 6 and the optical fiber mounting waveguide device 1.

It is possible to decrease the optical connection loss with the optical fiber 6, when the difference between the refractive index of the material after curing and the refractive index of the core 4 is within ±0.005.

A protruding length of the protruded part 4a of the core 4 is preferably from 10 to 50 μm. 10 μm is determined as a lower limit, since this length is a limit for a location shifting of the photomask in the direct exposure, and the protruded part 4a having a length greater than 10 μm can be manufactured with an excellent accuracy. When the protruding length of the protruded part 4a of the core is around 70 μm, the optical connection loss is increased. However, when the protruding length of the protruded part 4a of the core 4 is not greater than 50 μm, the light will not be dispersed to be broader than the core diameter of the optical fiber, so that the increase in the optical connection loss may be negligibly small.

Although the invention has been described with respect to the specific embodiments for complete and clear disclosure, the appended claims are not to be therefore limited but are to be construed as embodying all modifications and alternative constructions that may occur to one skilled in the art which fairly fall within the basic teaching herein set forth.

What is claimed is:

1. An optical fiber mounting waveguide device, comprising:
   a substrate;
   an optical fiber mounting groove provided on a part of the substrate for mounting an optical fiber;
   an under cladding layer and a core sequentially formed on the substrate; and
   an over cladding layer formed on the core, the over cladding layer having an end surface facing to the optical fiber mounting groove,
   wherein the core and the under cladding layer are protruded toward the optical fiber mounting groove with respect to the end surface of the over cladding layer, and
   wherein an end surface of the core protrudes with respect to the end surface of the over cladding layer, and the end surface of the core and the end surface of the over cladding layer are provided on different planes.

2. The optical fiber mounting waveguide device according to claim 1, wherein the core comprises a plurality of cores coupled to each other outside the end surface of the over cladding layer.

3. The optical fiber mounting waveguide device according to claim 1, wherein the core comprises a plurality of cores, and each of the cores is extended to adjacent ones outside the end surface of the over cladding layer.

4. An optical fiber mounting waveguide device, comprising:
   a substrate;
   an optical fiber mounting groove provided on a part of the substrate for mounting an optical fiber;
   an under cladding layer and a core sequentially formed on the substrate; and
   an over cladding layer formed on the core, the over cladding layer having an end surface facing to the optical fiber mounting groove,
   wherein the core and the under cladding layer are protruded toward the optical fiber mounting groove with respect to the end surface of the over cladding layer,
   wherein the optical fiber is mounted in the optical fiber mounting groove, an end surface of the optical fiber contacting with the core,
   wherein the core and the optical fiber are connected by curing an adhesive filled between the end surface of the optical fiber and end surfaces of the over cladding layer, the core, and the under cladding layer, and
   wherein a difference between refractive indices of the core and the adhesive after curing is within ±0.005.

5. The optical fiber mounting waveguide device according to claim 4, wherein a material of the core is same as a material of the adhesive.

6. A method for fabricating an optical fiber mounting waveguide device, said method comprising:
   forming an optical fiber mounting groove on the optical fiber mounting waveguide device for mounting an optical fiber;
   forming an under cladding layer and a core sequentially on a substrate at a position facing to the optical fiber mounting groove;
   coating a cladding material on the under cladding layer and the core;
   providing a mask pattern for covering a part of the over cladding layer at the position facing to the optical fiber mounting groove; and
   exposing the cladding material to provide an over cladding layer,
   wherein the core and the under cladding layer are protruded toward the optical fiber mounting groove with respect to an end surface of the over cladding layer.

7. The method for fabricating an optical fiber mounting waveguide device according to claim 6, wherein the core comprises a plurality of cores coupled to each other outside the end surface of the over cladding layer.

8. The method for fabricating an optical fiber mounting waveguide device according to claim 6, wherein the core comprises a plurality of cores, and each of the cores is extended to adjacent ones outside the end surface of the over cladding layer.

9. The method for fabricating an optical fiber mounting waveguide device according to claim 6, further comprising:
   mounting the optical fiber in the optical fiber mounting groove such that an end surface of the optical fiber contacts with the core; and
   curing an adhesive filled between the end surface of the optical fiber and end surfaces of the over cladding layer, the core, and the under cladding layer, to connect the core and the optical fiber,
   wherein a difference between refractive indices of the core and the adhesive after curing is within ±0.005.

10. The method for fabricating an optical fiber mounting waveguide device according to claim 9, wherein a material of the core is same as a material of the adhesive.

11. The optical fiber mounting waveguide device according to claim 1, wherein the end surface of the core is placed closer to the optical fiber mounting groove than the end surface of the over cladding layer.

12. The optical fiber mounting waveguide device according to claim 1, wherein a space between a curved surface of the end surface of the core and the optical fiber lacks a cladding layer.

13. The optical fiber mounting waveguide device according to claim 1, wherein an adhesive is disposed between a curved surface of the end surface of the core and the optical fiber.

14. The optical fiber mounting waveguide device according to claim 1, further comprising:
   an optical fiber fastening wedge formed on extended lines of central axes of regions between said core and another core,
   wherein a space between the end surface of the over cladding layer and the optical fiber fastening wedge is filled with an adhesive.

15. The optical fiber mounting waveguide device according to claim 1, wherein the end surface of the core has a round shape.

16. The optical fiber mounting waveguide device according to claim 1, wherein an adhesive filled between the end surface of the optical fiber and end surfaces of the over cladding layer, the core, and the under cladding layer, connects the core with the optical fiber.

17. The optical fiber mounting waveguide device according to claim 1, wherein the end surface of the core and the end surface of the over cladding layer have a level difference with respect to each other.

18. The method for fabricating an optical fiber mounting waveguide device according to claim 6, wherein an end surface of the core protrudes with respect to the end surface of the over cladding layer, and the end surface of the core and the end surface of the over cladding layer are provided on different planes.

19. The method for fabricating an optical fiber mounting waveguide device according to claim 6, wherein an end surface of the core and the end surface of the over cladding layer have a level difference with respect to each other.

* * * * *

UNITED STATES PATENT AND TRADEMARK OFFICE
CERTIFICATE OF CORRECTION

PATENT NO. : 7,876,988 B2  Page 1 of 1
APPLICATION NO. : 12/149530
DATED : January 25, 2011
INVENTOR(S) : Yasuda et al.

It is certified that error appears in the above-identified patent and that said Letters Patent is hereby corrected as shown below:

On title page

Please correct the second Inventor's residence as follows:

(75) Inventors:

Kouki HIRANO, HITACHI<u>NAKA</u> (JP)

Signed and Sealed this
Seventh Day of June, 2011

David J. Kappos
*Director of the United States Patent and Trademark Office*